(12) United States Patent
Flatten et al.

(10) Patent No.: US 10,803,169 B1
(45) Date of Patent: Oct. 13, 2020

(54) THREAT DETECTION SYSTEM WITH MACHINE MODELS FOR ACCOUNTS WITHIN AN ORGANIZATION UNIT

(71) Applicant: Amazon Technologies, Inc., Seattle, WA (US)

(72) Inventors: Aaron Flatten, Portland, OR (US); Shane Anil Pereira, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 292 days.

(21) Appl. No.: 15/925,029

(22) Filed: Mar. 19, 2018

(51) Int. Cl.
  *G06F 21/55* (2013.01)
  *H04L 29/06* (2006.01)
  *G06F 21/56* (2013.01)
  *G06N 20/00* (2019.01)

(52) U.S. Cl.
  CPC .......... *G06F 21/554* (2013.01); *G06F 21/552* (2013.01); *G06F 21/566* (2013.01); *G06N 20/00* (2019.01); *H04L 63/1416* (2013.01); *H04L 63/1425* (2013.01)

(58) Field of Classification Search
  CPC .................................................... G06F 21/554
  See application file for complete search history.

(56) References Cited

U.S. PATENT DOCUMENTS

| | | | |
|---|---|---|---|
| 10,204,374 B1* | 2/2019 | Holan | G06Q 30/0637 |
| 2018/0046926 A1* | 2/2018 | Achin | G06Q 10/04 |
| 2018/0060738 A1* | 3/2018 | Achin | G06Q 30/0201 |
| 2019/0220863 A1* | 7/2019 | Novick | G06Q 20/10 |

* cited by examiner

*Primary Examiner* — Simon P Kanaan
(74) *Attorney, Agent, or Firm* — Lowenstein Sandler LLP

(57) ABSTRACT

A processing device receives a request to create a second account in a cloud computing system having multiple web services. The request specifies an organization unit (OU) associated with a first account of the cloud computing system. A first instance of a threat detection service monitors activity data associated with the first account and detects anomalous activity by the first account using a first machine learning (ML) model. The processing device creates the second account and attaches the second account to the OU. The processing device generates a second ML model for the second account using at least a portion of the first ML model and monitors subsequent activity data associated with the second account using the second ML model to detect anomalous activity by the second account.

22 Claims, 7 Drawing Sheets

US 10,803,169 B1

THREAT DETECTION SYSTEM WITH MACHINE MODELS FOR ACCOUNTS WITHIN AN ORGANIZATION UNIT

BACKGROUND

Threat detection technologies can be used to protect computing resources by monitoring for malicious or unauthorized behavior. Some threat detection technologies require deployment and maintenance of software or security infrastructures, often including agents at endpoints of the infrastructure. These security infrastructures can be cumbersome, expensive, and ineffective at times.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

DETAILED DESCRIPTION

The present disclosure relates to techniques for creating stochastic model, such as a machine learning (ML) model, for a new account in a cloud computing system from an existing stochastic model used in a threat detection system for monitoring an existing account. Embodiments of the disclosure relate in particular to leveraging organization units (OUs) in an organization web service (also referred to as organization service) that centrally controls resources and services used by multiple accounts of the cloud computing system. For example, a threat detection service can train and use ML models to detect unexpected or anomalous activity in an account. When a brand new account is added, it may be not be clear what activity is anomalous for the new account. Until a new ML model can be trained for the new account, the threat detection service may not be as effective at detecting anomalous activity, at least until its model(s) is able to acquire a sufficient training data set based on the new account's normal usage. As described herein, embodiments may leverage OUs in an organization web service and train ML models by OU (or on an OU basis) against all of the accounts in that OU. Using an example, a company with two software development teams, each with their own web service accounts used exclusively for development workloads (account A) and test workloads (account B). Over time as these accounts are used, the ML model for account A learns to recognize anomalous activity in account A and the ML model for account B learns to recognize anomalous activity in account B. However, if the company later adds a new development account C, a ML model for account C may not be as effective at detecting anomalous activity, at least until the ML model for account C were able to acquire a sufficient training data based on the account C's normal usage. The company could have grouped accounts A and B under a "Dev/Test" OU. In that case, when account C was created under the OU, the threat detection service could immediately being recognizing unexpected or malicious activity in the account C on training data already gathered from other accounts in the same OU (accounts A and B). It should be noted that various embodiments describe the stochastic model as being a ML model. In other embodiments, other types of modelling may be used to obtain a model of the event data to detect anomalous behavior, such as statistical models, predictive models, or the like.

Figure 1:
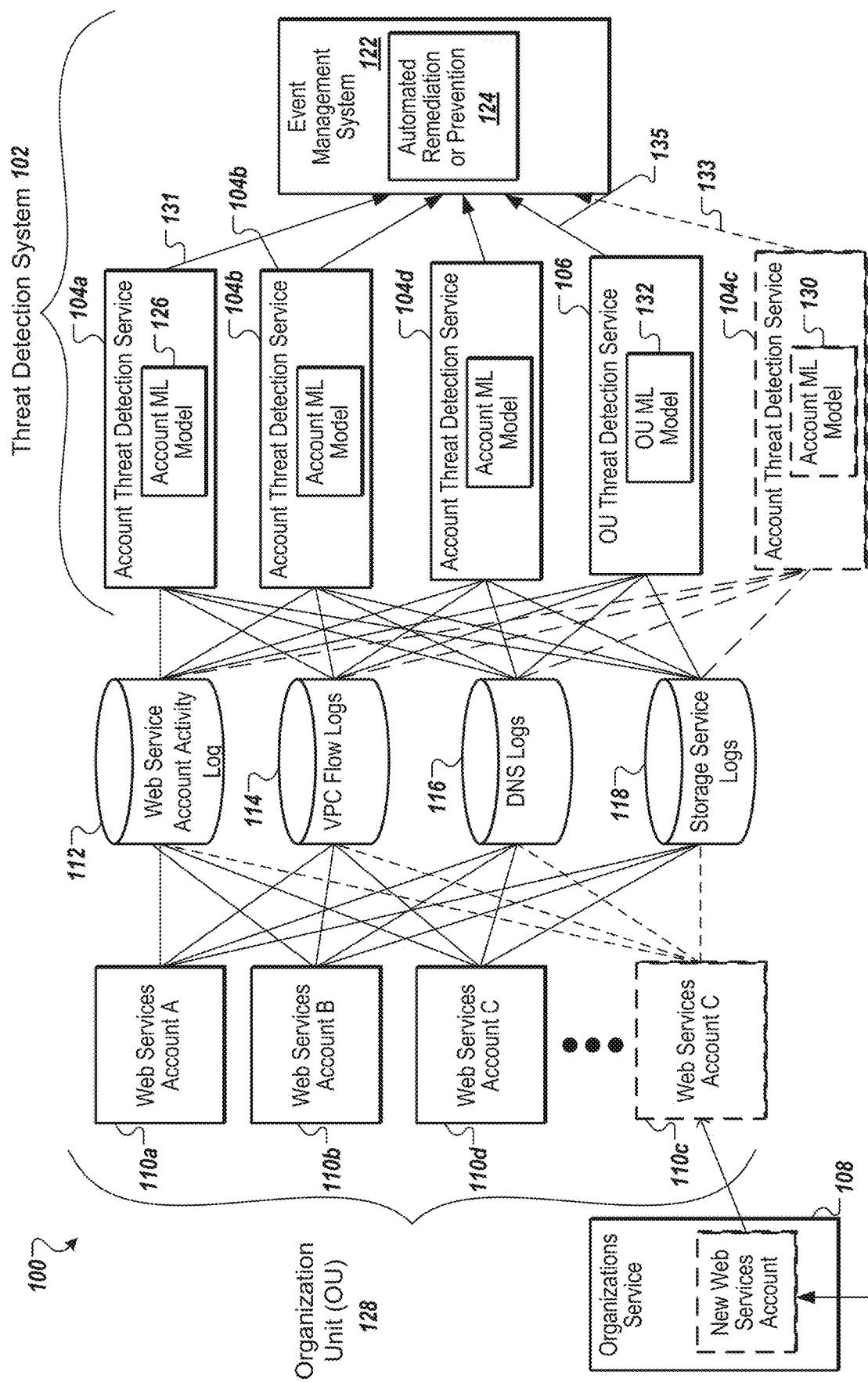
FIG. 1 is a block diagram of a cloud computing system with a threat detection system capable of threat detection intelligence for multiple web services accounts at an account level and at an OU level according to one embodiment.

FIG. 1 is a block diagram of a cloud computing system 100 with a threat detection system 102 capable of threat detection intelligence for multiple web services accounts at an account level and at an OU level according to one embodiment. The threat detection system 102 is a managed threat detection service that continuously monitors for malicious or unauthorized behavior to help you protect your web service accounts (e.g., AWS accounts) and workloads in the cloud computing system 100. The threat detection system 102 may include one or more instances of the threat detection service, such as one or more account threat detection services 104a-d and one or more OU threat detection services 106. The threat detection service monitors for activity such as unusual API calls or potentially unauthorized deployments that indicate a possible account compromise. The threat detection service also detects potentially compromised instances or reconnaissance by attackers. The threat detection services 104a-d, 106 or the threat detection system 102 can be enabled via a management console (e.g., AWS Management Console) of the cloud computing system 100. The threat detection services 104a-d, 106 (or the threat detection system 102) can immediately begin analyzing billions of events across multiple web service accounts 110 for signs of risk, anomalous behavior, anomalous activity, or the like. A threat detection service 104 identifies suspected attackers through integrated threat intelligence feeds and uses machine learning to detect anomalies in account and workload activity. When a potential threat is detected, the service delivers a detailed security alert to an event management system 122 that may include a threat detection service console, a monitoring service (e.g., Amazon CloudWatch service) that collects and monitors log files, sets alarms, and automatically react to changes in cloud resources, or the like. For example, the event management system 122 may include the Amazon CloudWatch service that can monitors AWS resources such as Amazon EC2 instances, Amazon DynamoDB tables, and Amazon RDS DB instances, as well as custom metrics generated by your applications and services, and any log files your applications generate. The collected data can be AWS CloudWatch Events. Alternatively, other monitoring system can be used. The reporting to the event management system 122 can make alerts actionable and easy to integrate into existing event management and workflow systems. The event management system 122 can be used to gain system-wide visibility into resource utilization, application performance, and operational health. These insights can be used to react and keep application running smoothly.

The threat detection system 102 is cost effective and easy to deploy as compared to traditional software security infrastructure because the threat detection service can be enabled quickly with no risk of negatively impacting existing application workloads, there is no software to deploy at endpoints in the infrastructure, and no threat intelligence feeds required.

An OU may be a group of one or more accounts to which one or more service control policies (SCPs) can be applied. In one embodiment, an organization service 108 can offer policy-based management for multiple accounts. For example, the organization service 108 can create groups of accounts and then apply policies (SCPs) to those groups. The organization service 108 can enable centrally management of policies across multiple accounts, without requiring custom scripts and manual processes. The organization service 108 may automate the creation of new accounts through application programming interfaces (APIs). The APIs enable creation of new accounts programmatically and to add the new accounts to a group of accounts, called OUs. The policies attached to the OU can be automatically applied to the new account. For example, the APIs can be used to automate the creation of sandbox accounts for developers and grant entities in those accounts access only to the necessary web services. The organization service 108 can create SCPs for an OU or multiple OUs that centrally controls resources and services used by multiple accounts. SCPs put bounds around the permissions that Identity and Access Management (IAM) policies can grant to entities in an account, such as IAM users and roles. For example, IAM policies for an account in your organization cannot grant access to a dedicated network connection (e.g., AWS Direct Connect) if access is not also allowed by the SCP for the account. Entities can only use the services allowed by both the SCP and the IAM policy for the account. Alternatively, the embodiments described herein can be implemented without a separate organization services 108.

As noted above, the threat detection system 102 provides intelligent threat detection by collecting, analyzing, and correlating billions of events (referred to herein as event data) from multiple sources across the web services accounts 110*a-d*. These sources may include a data store 112 that stores account activity data from an account activity log (e.g., AWS CloudTrail data), a data store 114 that stores virtual private cloud (VPC) flow data from a VPC flow log (e.g., Amazon VPC Flow Logs), a data store 116 that stores domain name system (DNS) log data from a DNS log, and/or a data store 118 that stores storage service data from a storage service log (e.g., S3 logs). An instance of the threat detection service, such as account threat detection service 104*a*, consumes multiple data streams, including several threat intelligence feeds, staying aware of malicious IP addresses, devious domains, and learning to accurately identify malicious or unauthorized behavior in web services accounts, as described in more detail below. In combination with information gleaned from VPC Flow Logs, AWS CloudTrail Event Logs, DNS logs, S3 logs, this allows account threat detection service 104*a* to detect many different types of dangerous and mischievous behavior including probes for known vulnerabilities, port scans and probes, and access from unusual locations. The account threat detection service 104*a* looks for suspicious account activity such as unauthorized deployments, unusual CloudTrail activity, patterns of access to AWS API functions, and attempts to exceed multiple service limits. The account threat detection service 104*a* can also look for compromised EC2 instances talking to malicious entities or services, data exfiltration attempts, and instances that are mining cryptocurrency. The account threat detection service 104*a* can monitor and detect anomalous activity for the web services account 110*a* (account A), whereas the account threat detection service 104*b* can monitor and detect anomalous activity for the web services account 110*b* (account B). The OU threat detection service can monitor and detect anomalous activity for multiple accounts in an OU. The threat detection service(s) can output findings as Amazon CloudWatch Events to the event management system 122. The event management system 122 may include at least one of a notification function, an automated remediation prevention function 124, such a function in a cloud computing service (e.g., AWS Lambda function) to automatically remediate specific types of issues, or the like. The automated remediation or prevention function 124 may include one or more notification actions, one or more automated preventing actions, one or more automated remedial action, or any combination thereof. The automated remediation or prevention function 124 also allows the event management system 122 to push out findings to other monitoring or management systems, such as Splunk, Sumo Logic, and PagerDuty, and/or to workflow systems like JIRA, ServiceNow, and Slack. In another embodiment, the threat detection service(s) can output to a monitoring service that can include the automated remediation or prevention function 124 and the automated remediation or prevention function 124 can push the findings to other event management systems or workflow systems.

In one embodiment, the event data can be logged and monitored by AWS CloudTrail service and stored in the data store 112. The AWS CloudTrail service is a service that enables governance, compliance, operational auditing, and risk auditing of web service account(s). With the AWS CloudTrail service, account activity related to actions across the cloud computing system can be logged, continuously monitored, and retained. The AWS CloudTrail service provides event history of account activity, including actions taken through the AWS Management Console, AWS SDKs, command line tools, and other AWS services. This event history simplifies security analysis, resource change tracking, and troubleshooting. For example, account activity occurs in the cloud computing system 100, and the AWS CloudTrail service captures and records the activity as a CloudTrail event. The activity in the CloudTrail event history can be viewed and downloaded. Also, the activity can be stored in a storage services, such as an Amazon S3 bucket. The CloudTrail events can be optionally delivered to CloudWatch logs and CloudWatch events. The data store 112 can store web service account activity logs for each of the web services accounts 110*a*-110*d*.

In another embodiment, the VPC flow data in the data store 114 can be logged from VPCs from the respective accounts. A VPC is a virtual network dedicated to a web services account 110. The VPC can be logically isolated from other virtual networks in the cloud computing system

100. Resources, such as Amazon E2C instances, can be launched into a VPC. The VPC can be configured by modifying its IP address range, create subnets, and configure route tables, network gateways, security settings, or the like. The VPC flows can be logged and stored in the data store 114. A flow log can be created for a VPC, a subnet, or a network interface. Each network interface in a VPC or subnet can be monitored and the flow log data may be published to a log group in CloudWatch logs, and each network interface may have a unique log stream. Log streams may contain flow log records, which are log events with fields that describe the traffic for that network interface. The VPC flow data in the data store 114 can be one type of network traffic data, such as netbook packet traffic data, packet traffic, or the like. In other embodiments, other network traffic data can be collected, stored, and used as event data. In another embodiment, processing activity data can be stored in a data store. The processing activity data can be any data associated with any application or operation running on a computing endpoint associated with an account.

In another embodiment, the DNS logs in the data store 116 can be logged from DNS queries in an account. The domain or subdomain that is requested, the data and time of the request, the DNS record type, the edge location that responded to the DNS query, the DNS response code, or the like, can be logged in the DNS logs. Alternatively, the DNS logs can be sent and stored in connection with CloudWatch logs.

In another embodiment, the storage service logs in the data store 118 can be detailed records from service access logging for the requests made to a bucket. Server access logs may be useful for many applications because they give insight into the nature of the requests made by clients not under their control The storage service logs may be Amazon Simple Storage Service (Amazon S3) logs. The storage service logs can be stored in a target bucket. An access log record contains details about the requests made to a bucket, including, for example, request type, the resources specified in the request, and the time and data the request was processed.

In other embodiments, the threat detection service(s) can collect event data from other sources not illustrated in FIG. 1.

In some embodiments, the threat detection system's 102 detections are made more accurate by incorporating threat intelligence (such as lists of known malicious Internet Protocol (IP) addresses provided by security services in the cloud computing system 100, third-party intelligence partners, or both. The threat detection system 102 also uses machine learning to detect anomalous account and network activities. For example, a threat detection service will generate an alert if it detects remote API calls from a known malicious IP address indicating potentially compromised account credentials. The threat detection service also detects direct threats to the cloud computing system 102, indicating a compromised instance, such as an Amazon EC2 instance sending encoded data within DNS queries.

In one embodiment, the threat detection system 102 includes a management console in which an administrator of an entity can organize multiple web service accounts into one or more OUs to help provide proper cost allocation, agility, and security. The management console allows threat detection service(s) to be enabled across any of the web service accounts, across one or more OUs in a centralized manner. With the threat detection system 102, there is no need to install additional security software or infrastructure to analyze account and workload activity data. A security operations center team can easily manage and triage threats from a single console view and automate security responses using a single security account.

In addition to detecting threats, the threat detection system 102 can also make it easy to automate responses to these threats, reducing remediation and recovery time. In one embodiment, preventative scripts, remediation scripts, or AWS Lambda functions can be configured to trigger based on threat detection service findings. For example, an AWS Lambda function can be configured to run code without provisioning or managing servers and scale the code with availability. The AWS Lambda function can be automatically triggered from other service in the cloud computing system or it can be called directly from the threat detection services 104. Threat detection service security findings may include the affected resource's details, such as tags, security groups, or credentials. The threat detection service findings also may include attacker information, such as IP address and geo-location. This may make threat detection service security findings informative and actionable. For example, account compromise can be difficult to detect quickly if account activities are not continuously monitored in near real-time. With the threat detection system 102, when an instance of the threat detection system 104 is suspected of having data stolen the service will alert an operator to be able to automatically create an access control entry restricting outbound access for that instance.

In one embodiment, with instances of the threat detection service 104 enabled to monitor all accounts, the instances of the threat detection service 104 automatically analyze network and account activity at scale, providing broad, continuous monitoring of web service accounts 110. The threat detection service 104 may combine managed rule-sets, threat intelligence from a security service in the cloud computing system 100, as well as third-party intelligence partners, anomaly detection, and ML models to intelligently detect malicious or unauthorized behavior. The detailed findings can be reviewed in the console or the findings can be input into the event management system 122 or other workflow systems. Alternatively, the findings can trigger automated code, such as an AWS Lambda function for automated remediation or prevention.

Referring to FIG. 1, in one embodiment, the threat detection system 102 is executed by one or more processors of the cloud computing system 100. The threat detection system 102 monitors event data corresponding to accounts 110*a* and 110*b* (or other accounts in the cloud computing system 100). Using an existing training ML Model 126, the threat detection system 102 detects an anomalous event 131 for an existing account (account A 110*a*) from the event data corresponding to the existing account. The anomalous event 131 is indicative of at least one of anomalous account activity or anomalous network activity by the existing account. The existing account, account A 110*a*, is assigned to an OU 128. The OU 128 may have one or more accounts 110. In the illustrated embodiment, the OU 128 includes three accounts 110*a*-110*c*. The organization web service 108 receives a request 120 to create a new account in the OU 128, namely web services account C 110*c*. The organization web service 108 can be executed by one or more processors of the cloud computing system 100. As described herein, the organization web service 108 centrally controls resources and services used by accounts 110 in the cloud computing system 100. The organization web service 108 creates the new account 110*c* and attaches the new account 110*c* to the OU 128. The organization web service 108 enables an instance of the account threat detection service 104c to monitor subsequent event data corresponding to the new account 110c. However, instead of waiting to train a ML model for the account threat detection service 104c with account and network activity for the new account 110c, the organization web service 108 creates a new ML model 130 from at least a portion of the existing ML model 126 corresponding to the account threat detection service 104a. The threat detection system 102 subsequently monitors subsequent event data corresponding to the multiple accounts 110a-110d. Using the new ML model 130, the threat detection system 102 detects an anomalous event 133 for the new account 110c from the subsequent event data corresponding to the new account 110c. The anomalous event 133 for the new account is indicative of malicious behavior or unauthorized behavior by the new account 110c. The anomalous event 133 can be detected earlier in time than it would take to train a new ML model using historical data from just the new web services account C 110c. However, as soon as the web services account C 110c is created, the event data can be collected and stored in the data stores 112-118. Similarly, the account threat detection service 104c can monitor the event data stored in the data stores 112-118 for anomalous behavior using the new ML model 130 that is already trained.

In a further embodiment, the threat detection system 102 monitors the event data in the data stores 112-118 by collecting, analyzing, and correlating at least one of: account activity data from an account activity log; virtual private cloud (VPC) flow data from a VPC flow log; domain name system (DNS) log data from a DNS log; storage service data from a storage service log; or the like.

In a further embodiment, the threat detection system 102 further includes an instance of the threat detection services that monitors multiple accounts of an OU, called OU threat detection service 106. The OU threat detection service 106 can use an OU-level trained ML model 132 corresponding to the accounts in the OU 128. The ML model 126 and the ML model 130 may be considered account-level trained ML modes. In one embodiment, instead of using the existing ML model 126 for the web service account A 110a to create the new ML model 130 for the new web services account C 110c, the OU-level trained ML model 132 can be used. That is, the new ML model 130 is created from at least a portion of the OU-level ML model 132. Alternatively, both an account-level trained ML and an OU-level trained ML model can be used to create a new account-level trained ML (e.g., ML model 130 for the new account 110c). In one embodiment, the new ML model 130 is created by generating a copy of the existing ML model 126 to be used as the new ML model 130. In another embodiment, the new ML model 130 is created by generating a copy of one or more features of the ML model 126, a copy of one or more features of the OU-level ML model 132, or any combination thereof. A feature of a ML model is an individual measurable property or characteristic of a pattern or behavior that can be observed. The ML model may also include a combination of features that are indicative of certain behaviors. A feature vector can be a set of numeric features. For example, a two-way classification from a feature vectors may include calculating a scalar product between the feature vector and a vector of weights, comparing the result with a threshold, and deciding the class based on the comparison. Algorithms for classification from a feature vector may include nearest neighbor classification, neural networks, Bayesian approaches, statistical techniques, or the like.

In one embodiment, in response to detection of the anomalous event 133, an automated remediation or prevention function 124 can be initiated in the cloud computing system 100. For example, the account threat detection service 104c can be initiated an automated remediation action or a prevention action in the event management system 122. Alternatively, the threat detection service 104c can output the anomalous event 133 to the event management system 122 and the event management system 122 can determine the appropriate remediation or prevention action to be performed. In another embodiment, the threat detection service 104c initiates an AWS Lambda function to execute in response to detection of the anomalous event 133.

In another embodiment, the request 120 is an API request received at the organization web service 108. The organization web service 108 centrally manages a SCP that controls resources and services used by the accounts 110a-d in the OU 128. The organization service 108 automatically creates the new account 110c and attaches it to the OU 128 in response to the API request.

Referring to FIG. 1, in another embodiment, the threat detection system 102, using the OU threat detection service 106, monitors event data corresponding to all accounts 110a, 110b, 110d in the OU 128. Using an OU-level trained ML model 132, the OU threat detection service 106 detects an anomalous event 135 for the OU 128 from the event data corresponding to the existing accounts in the OU 128. The anomalous event 135 is indicative of at least one of anomalous account activity or anomalous network activity by any one or more existing accounts in the OU 128. When the organization web service 108 The organization web service 108 receives the request 120 to create a new account in the OU 128, namely web services account C 110c. The organization web service 108 creates the new account 110c and attaches the new account 110c to the OU 128. The organization web service 108 enables an instance of the account threat detection service 104c to monitor subsequent event data corresponding to the new account 110c. However, instead of waiting to train a ML model for the account threat detection service 104c with account and network activity for the new account 110c, the organization web service 108 creates a new ML model 130 from at least a portion of the existing OU-level trained ML model 132 corresponding to the accounts in the OU 128. The threat detection services 104c subsequently monitors subsequent event data corresponding to the new account 110c. The OU thread detection service 106 monitors the accounts, including the new account 110c, in the OU 128 for subsequent event data. Using the new ML model 130, the threat detection service 104c detects the anomalous event 133 for the new account 110c from the subsequent event data corresponding to the new account 110c. The anomalous event 133 for the new account is indicative of malicious behavior or unauthorized behavior by the new account 110c. The anomalous event 133 can be detected by the ML model 130 earlier in time than it would take to train a new ML model using historical data from just the new web services account C 110c. However, as soon as the web services account C 110c is created, the event data can be collected and stored in the data stores 112-118. Similarly, the account threat detection service 104c can monitor the event data stored in the data stores 112-118 for anomalous behavior using the new ML model 130 that is already trained.

Figure 2:
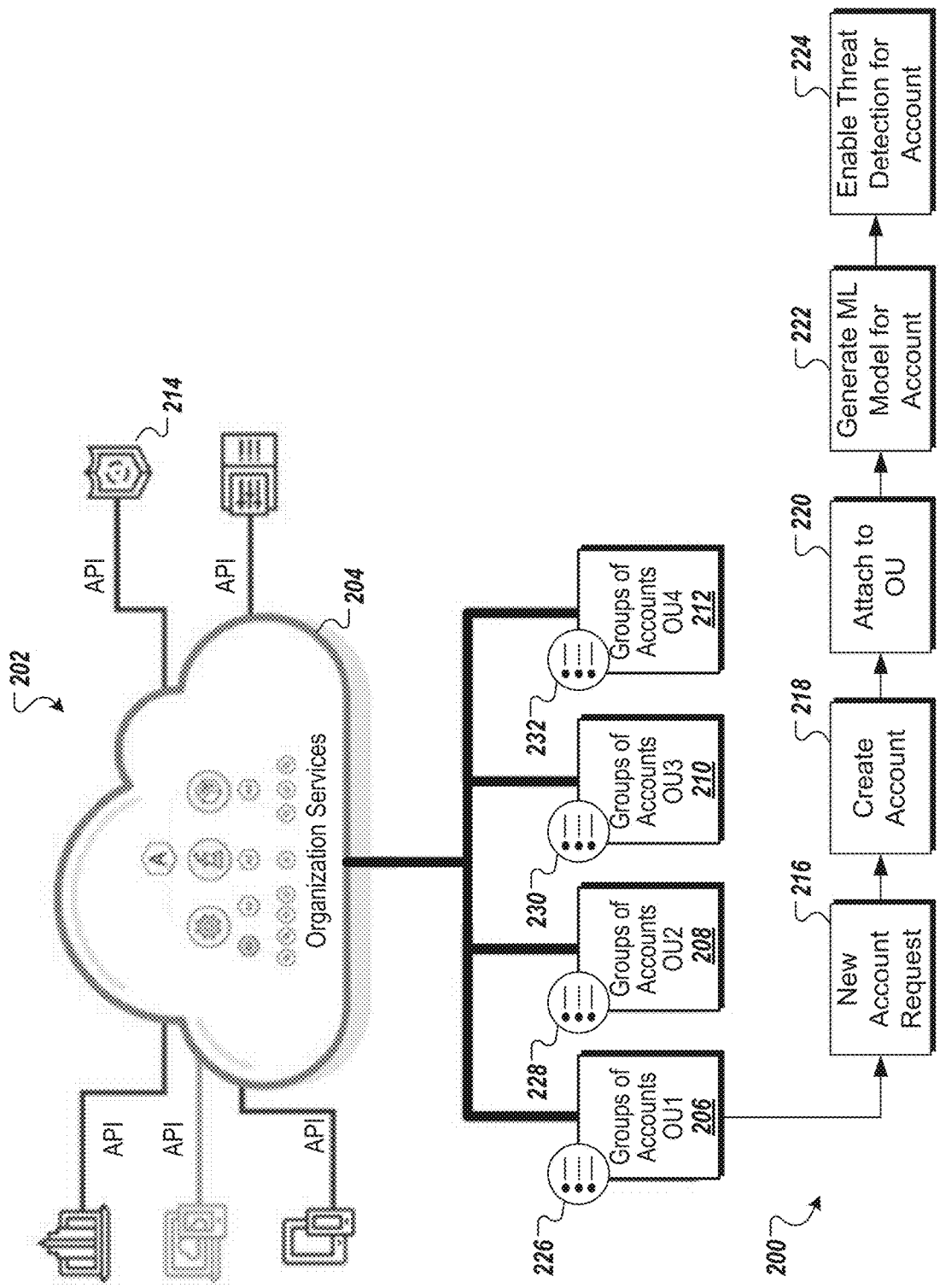
FIG. 2 is a functional diagram illustrating a process to generate a new ML model for a second account being added to an OU using at least a portion of an existing ML model for a first account according to one embodiment.

FIG. 2 is a functional diagram illustrating a process 200 to generate a new ML model for a second account being added to an OU using at least a portion of an existing ML model for a first account according to one embodiment. A cloud computing system 202 includes an organization service 204. The organization service 204 can be accessed by various types of devices and services using multiple APIs. The organization service 204 organizes multiple accounts into one or more groups, called organization units (OUs). As illustrated in FIG. 2, the organization service 204 has four OUs 206, 208, 210, and 212. The process 200 begins receiving, by a processing device executing the organization service 204, a request to create a second account in a cloud computing system 202 (block 216). The request specifying an organization unit (OU) associated with a first account of the cloud computing system 202 having multiple services, including the organization service 204 and a threat detection service 214. A first instance of a threat detection service 214 monitors activity data (e.g., account activity, network activity, or other event data) associated with the first account and detects anomalous activity by the first account using a first ML model. The process 200 creates the second account (block 218). The process 200 attaches the second account to the OU (block 220). In the illustrated embodiment, the request specifies the OU1 206, so the process 200 attaches the second account to the OU1 206. The process 200 generates a second ML model for the second account using at least a portion of the first ML model, since the first ML model is associated with the OU1 206 (block 222). The process 200 enables a second instance of the thread detection service 214 to monitor subsequent activity data associated with the second account using the second ML model to detect anomalous activity by the second account (block 224). In this manner, the process 200 can immediately start to detect anomalous activity by the second account upon its creation and attachment to the OU1 206 using a trained ML model associated with the OU1 206. The trained ML model associated with the OU1 206 may be an account-level trained ML model corresponding to one of the other accounts in the OU1 206. Alternatively, the trained ML model associated with the OU1 206 may be an OU-level trained ML model corresponding to all of the accounts in the OU1 206. In one embodiment, the process 200 at block 222 generates a copy of the first ML model, associated with the first account, to generate the second ML model. In another embodiment, the process 200 at block 222 generates a limited copy of the first ML model, such as by selecting features of the first ML model to copy for the second ML model.

In another embodiment, the process 200 at block 222 identifies at least one features of the first ML model and creates a copy of the at least one feature of the first ML model to generate the second ML model. In another embodiment, the first ML model includes multiple features and each feature includes a feature-stability score. The process 200 at block 222 can generate the second ML model by identifying at least one feature of the first ML model having a feature-stability score above a threshold value and creating a copy of the at least one feature of the first ML model having the feature-stability score above the threshold value to generate the second ML model.

In another embodiment, the OU1 206 includes a first instance of the threat detection service for the first account, a second instance of the threat detection service for the second account, as well as a third instance of the threat detection service for the OU1 206. The third instance of the threat detection service monitors activity data associated with the first account and a third account of OU1 206 and detects anomalous activity by the first account, the third account, or both, using a third ML model. The third account is associated with the OU1 206. The third instance may be considered an OU-level threat detection services since it monitors multiple accounts in the OU1 206 and the third ML model can be considered an OU-level trained ML model. The second ML model generated at block 222 can be generated from at least a portion of the first ML model and a portion of the third ML model (OU-level trained ML model).

In another embodiment, the OU1 206 includes a first instance of the threat detection service for the first account, a second instance of the threat detection service for the second account, as well as a third instance of the threat detection service for a third account associated with the OU1 206. The third instance of the threat detection service monitors activity data associated with the third account and detects anomalous activity by the third account a third ML model. The third instance may be considered to be an account-level threat detection services since it monitors the third account in the OU1 206 and the third ML model can be considered an account-level trained ML model. The second ML model generated at block 222 can be generated from at least a portion of the first ML model and a portion of the third ML model (account-level trained ML model).

In one embodiment, the first ML model includes multiple features, each feature including a feature-stability score. The third ML model may also include one or more features, each feature including a feature-stability score. The process 200 at block 222 can generate the second ML model by identifying a feature of the first ML model having a feature-stability score above a threshold value; identifying a feature of the third ML model having a feature-stability score above the threshold value; and creating a copy of the feature of the first ML model and a copy of the feature of the third ML model to generate the second ML model.

In another embodiment, the first ML model includes a model stability score and the third model includes a second model stability score. The process 200 at block 222 can generate the second ML model by: determining that the first stability score is higher than the second stability score; and creating a copy the first ML model to generate the second ML model.

In another embodiment, the request at block 216 is an API request received at the organization service 204. The process 200 at block 218 can create the second account by automatically creating the second account in response to the API request. The process 200 at block 220 can attach the second account to the OU1 206 by automatically attaching the second account to the OU1 206 in response to the API request. The organization service 204 centrally manages a SCP 226 that controls resources and services used by the one or more of the accounts in the OU1 206. Similarly, the organization service 204 can create the OU2 208, OU3 210, and OU4 212 and centrally manage a SCP 228, a SCP 230, and a SCP 232, respectively, which control resources and services used by the respective accounts in the respective OUs 208, 210, 212.

Figure 3:
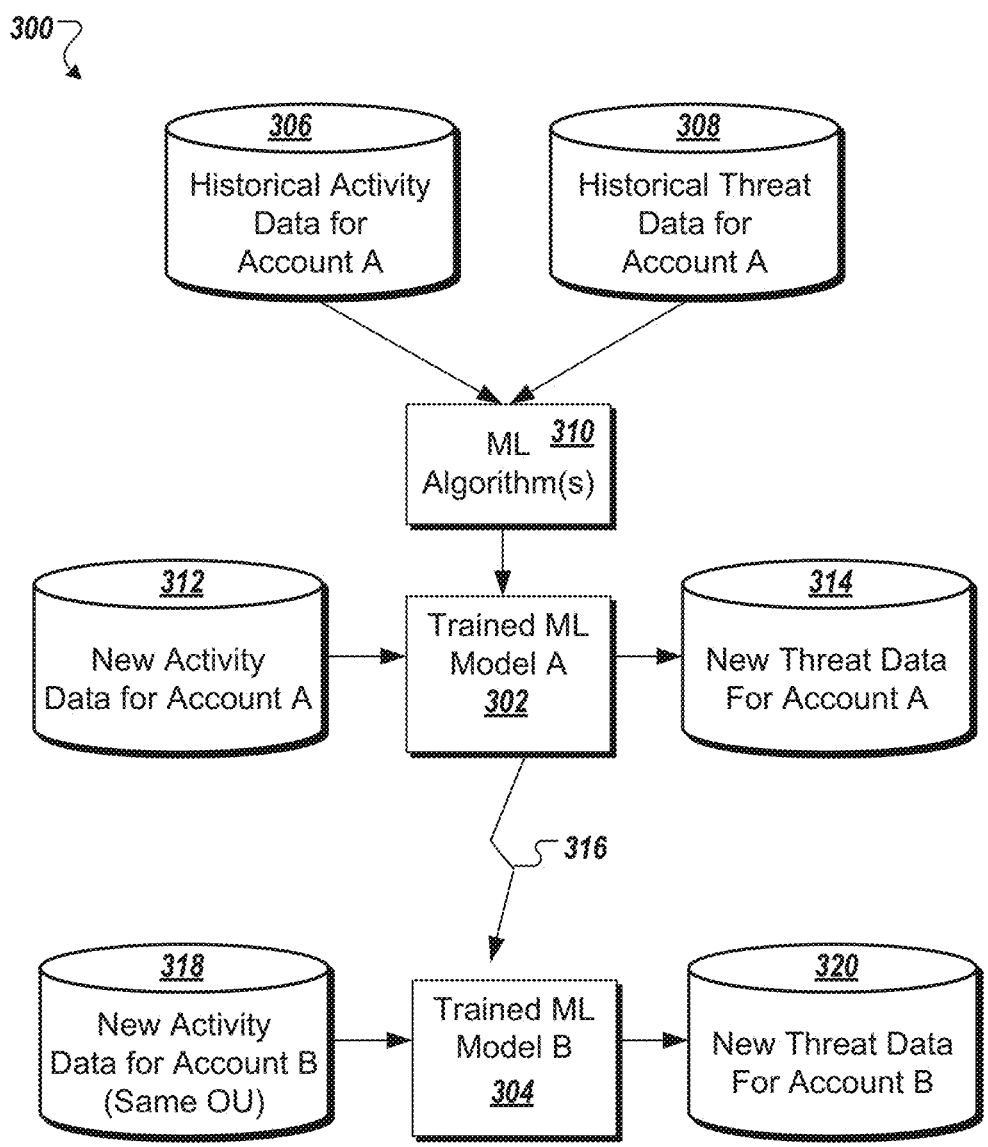
FIG. 3 is a block diagram illustrating training a first ML model for a first account in an OU and generating a second ML model for a second account from the first ML model according to one embodiment.

FIG. 3 is a block diagram illustrating training a first ML model 302 for a first account in an OU and generating a second ML model 304 for a second account from the first ML model 302 according to one embodiment. To train the first ML model 302, historical activity data 306 for the first account (Account A) and historical threat data 308 for the first account (Account A) are input into one or more ML algorithms 310. The ML algorithms 310 are used to train the first ML model 302. Anomaly detection can be used to identify items or events that do not conform to an expected pattern or to other items present in a data set. Using machine learning for anomaly detection can increase the speed of detection of the anomalies in new data to detect anomalous event. ML algorithms 310 can be used to detect and classify anomalies in relevant data as it pertains to threats. The machine learning algorithms 310 have the ability to learn from historical data and make predictions of new data based on the historical data. Two machine learning techniques may be used for anomaly detection: supervised machine learning and unsupervised machine learning. In supervised machine learning, a labeled training set that contains both normal and anomalous samples can be used to train the ML model 302. For example, the ML algorithms 310 can be to train a model using supervised methods such as neural networks, parameterization of training model, support vector machine learning, k-nearest neighbors, Bayesian networks, decision trees, or the like. K-nearest neighbor (k-NN) is a technique that is commonly used in anomaly detection. This technique calculates the approximate distances between different points on the input vectors and then assigned the unlabeled point to the classification of its K-nearest neighbors. The Bayesian network uses probabilistic relationships among variables of interest. This can be used in connection with statistical computations. Supervised machine learning can determine interdependencies between features and predict events.

After the first ML model 302 is trained, the first ML model 302 can be validating using additional historical data. After training and validation, the first ML model 302 is deployed for use by the threat detection service to analyze new activity data 312 for the first account (Account A). The new activity data 312 is input into the trained first ML model 302 and the trained first ML model 302 can output new threat data 314 for the first account (Account A). In response to a request 316 to create a new account (Account B) in the same OU as the first account (Account A), a second ML model 304 for the new account (Account B) is generated. The second ML model 304 may be an OU-level trained ML model or an account-level trained ML model, as described above. New activity data 318 for the second account (Account B in the same OU as Account A) is input into the second ML model 304 and the second ML model 304 outputs new threat data 320 for the second account (Account B).

The embodiments illustrated in FIG. 3 may use the historical data as a training data set for supervised learning. In other embodiments, unsupervised machine learning can be used to train the first ML model 302 in which training data may not be required. In unsupervised machine learning, groups of similar samples that appear frequently are assumed to be normal behavior and data groups that are infrequent may be classified as anomalous behavior. Some common unsupervised algorithms are self-organizing maps (SOM), K-means, C-means, expectation-maximization meta-algorithm (EM), adaptive resonance theory (ART), one-class support vector machine, or the like. The machine learning algorithms 310 have the ability to learn from historical data and make predictions of new data based on the historical data. Two machine learning techniques may be used for anomaly detection: supervised machine learning and unsupervised machine learning. In supervised machine learning, a labeled training set that contains both normal and anomalous samples can be used to train the ML model 302. For example, the ML algorithms 310 can be to train a model using supervised methods such as neural networks, parameterization of training model, support vector machine learning, k-nearest neighbors, Bayesian networks, decision trees, or the like. K-nearest neighbor (k-NN) is a technique that is commonly used in anomaly detection. This technique calculates the approximate distances between different points on the input vectors and then assigned the unlabeled point to the classification of its K-nearest neighbors. The Bayesian network uses probabilistic relationships among variables of interest. This can be used in connection with statistical computations. Supervised machine learning can determine interdependencies between features and predict events.

It should be noted that sometimes ML models are referred to as ML algorithms themselves. The ML algorithms 310 refer to the learning method used to train the first ML model 302 that is deployed to detect new threat data 314. The first ML model 302 can use ML algorithms to process the new activity data 312 to detect new threat data 314.

In another embodiment, a cloud computing system includes one or more memory devices and one or more processing devices operatively coupled to the one or more memory devices. The cloud computing system, via the one or more processors, execute a policy-based management service to centrally control resources and services used by multiple accounts of the cloud computing system across multiple accounts. The policy-based management service receives a request to create a second account. The request specifying an OU associated with a first account. A first instance of a threat detection service is enabled to detect anomalous activity by the first account using a first ML model. The policy-based management service creates the second account and attaches the second account to the OU. The policy-based management service generates a second ML model for the second account using at least a portion of the first ML model. The policy-based management service enables a second instance of the threat detection service to detect anomalous activity by the second account using the second ML model.

In a further embodiment, the policy-based management service, to generate the second ML model, creates a copy of the first ML model to be used as the second ML model. In another embodiment, the policy-based management service identifies at least one feature of the first ML model and creates a copy of the at least one feature of the first ML model to be used for the second ML model. The first ML model may have multiple features, each having a feature-stability score. The policy-based management service may generate the second ML model by identifying at least one feature of the first ML model having a feature-stability score above a threshold value and creating a copy of the at least one feature of the first ML model to be used in the second ML model.

In another embodiment, a third instance of the threat detection service is enabled to detect anomalous activity by the first account, a third account, or both, using a third ML model. The third account is associated with the OU. This third ML model may be an OU-level trained ML model, as described herein. In another embodiment, a third instance of the threat detection service is enabled to detect anomalous activity by a third account using a third ML model. The third account is associated with the OU. This third ML model may be an account-level trained ML mode, as described herein.

Figure 4:
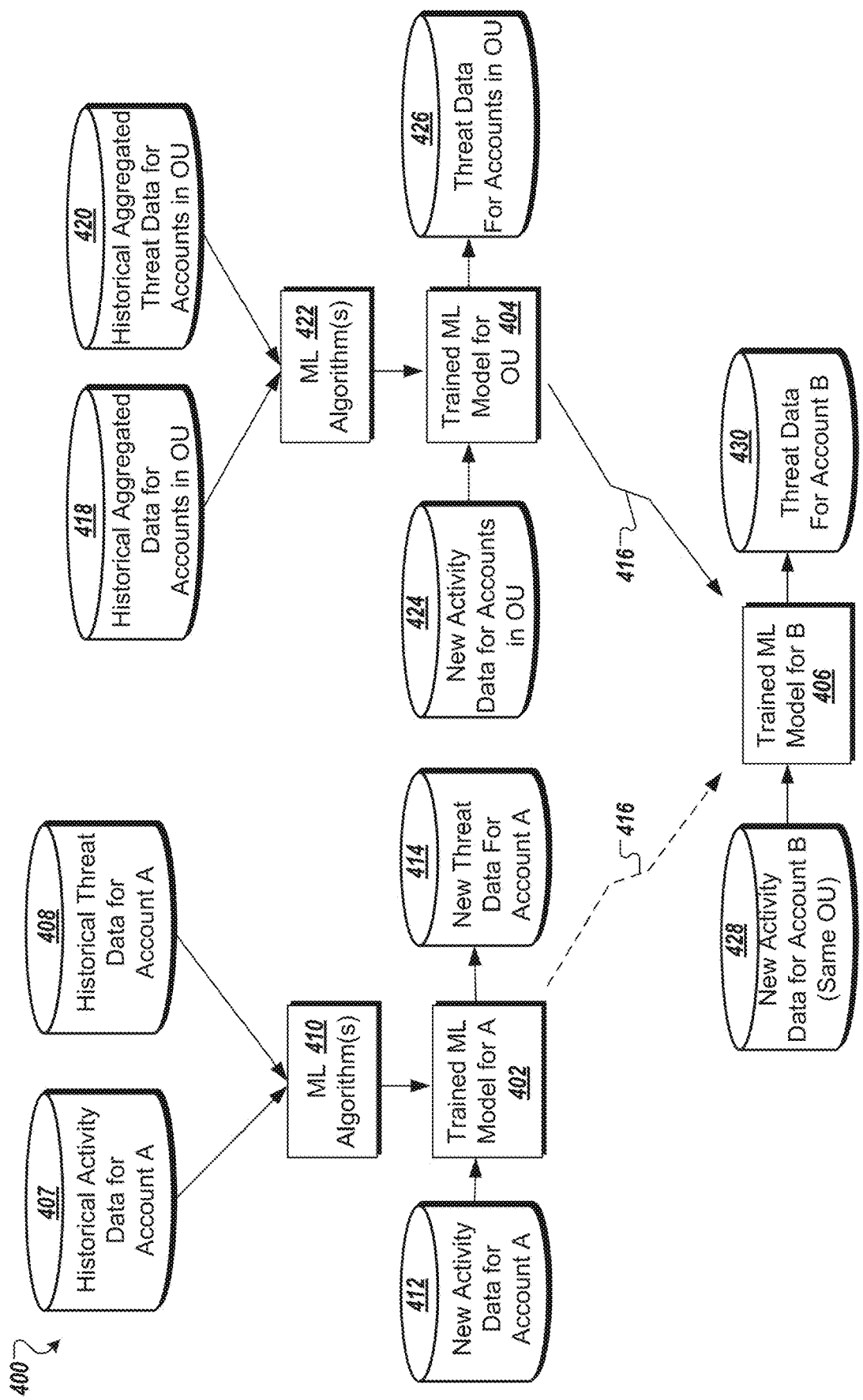
FIG. 4 is a block diagram illustrating training a first ML model for a first account in an OU and training a second ML model for the OU and generating a third ML model for a second account from the first ML model, the second ML model, or both, according to one embodiment.

FIG. 4 is a block diagram illustrating training a first ML model 402 for a first account in an OU and training a second ML model 404 for the OU and generating a third ML model 406 for a second account from the first ML model 402, the second ML model 404, or both, according to one embodiment. To train the first ML model 402, historical activity data 407 for the first account (Account A) and historical threat data 408 for the first account (Account A) are input into one or more ML algorithms 410. The ML algorithms 410, which may be similar to the ML algorithms 310 described above, are used to train the first ML model 402. After the first ML model 402 is trained (and/or validated), the first ML model 402 is deployed for use by the threat detection service to analyze new activity data 412 for the first account (Account A). The new activity data 412 is input into the trained first ML model 402 and the trained first ML model 402 can output new threat data 414 for the first account (Account A).

To train the second ML model 404 for the OU (labeled "Trained ML model for OU"), historical aggregated activity data 418 for all (or some) of the accounts in the OU and historical aggregated threat data 420 for the accounts in the OU are input into one or more ML algorithms 422. The ML algorithms 422, which may be similar to the ML algorithms 310 described above, are used to train the second ML model 404. After the second ML model 404 is trained (and/or validated), the second ML model 404 is deployed for use by the threat detection service to analyze new activity data 424 for accounts in the OU. The new activity data 424 is input into the trained second ML model 404 and the trained second ML model 404 can output new threat data 426 for the accounts in the OU.

In response to a request 416 to create a new account (Account B) in the same OU as the first account (Account A), a third ML model 406 for the new account (Account B) is generated. The third ML model 406 may be an account-level trained ML model, as described above. Alternatively, the third ML model 406 may be an OU-level trained ML model based on how the trained ML model 406 is built from the first ML model 402 and the second ML model 404, as described herein. New activity data 428 for the second account (Account B in the same OU as Account A) is input into the trained third ML model 406 and the trained third ML model 406 outputs new threat data 430 for the second account (Account B).

The embodiments illustrated in FIG. 4 may use the historical data as a training data set for supervised learning. In other embodiments, unsupervised machine learning can be used to train the first ML model 402, the second ML model 404, and/or the third ML model 406.

In one embodiment, the first ML model 402 has a first model stability score and the second ML model 404 has a second model stability score. In some cases, in response to the request 416, processing logic determines that the first model stability score is higher than the second model stability score. As a result, the processing logic generates a copy of the first ML model 402 to be used as the third ML model 406. In response to the request 415, the processing logic determines that the second model stability score is higher than the first model stability score. As a result, the processing logic generates a copy of the second ML model 404 to be used as the third ML model 406.

In another embodiment, the first ML model 402 has multiple features, each feature having a feature-stability score, and the second ML model 404 has multiple features, each feature having a feature-stability score. In some cases, in response to the request 416, processing logic determines which features have a feature-stability score that exceeds a threshold value. As a result, the processing logic generates a copy of the features having a feature-stability score that exceeds the threshold value to be used in the third ML model 406. In another embodiment, the processing logic identifies a feature of the first ML model 402 having a feature-stability score above a threshold value and identifies a feature of the second ML model 404 having a feature-stability score above the threshold value. The processing logic creates a copy of the feature of the first ML model 402 and a copy of the feature of the second ML model 404 to generate the third ML model 406.

Although the embodiments of FIG. 4 show one OU at one level, the accounts can be organized with multiple OUs under a common, higher-level OU. For example, the OUs can be part of a tree structure having a root and one or more branches off any OU. FIG. 4, however, has been described for simplicity as being a single OU with multiple accounts. In some embodiments, a new OU can be created under a common, higher-level OU. For this new OA, the OU model can be used to create an OU ML Model for the new OU. Alternatively, the variations of creating ML models from existing models can be used for new OUs in a similar fashion as described herein.

Figure 5:
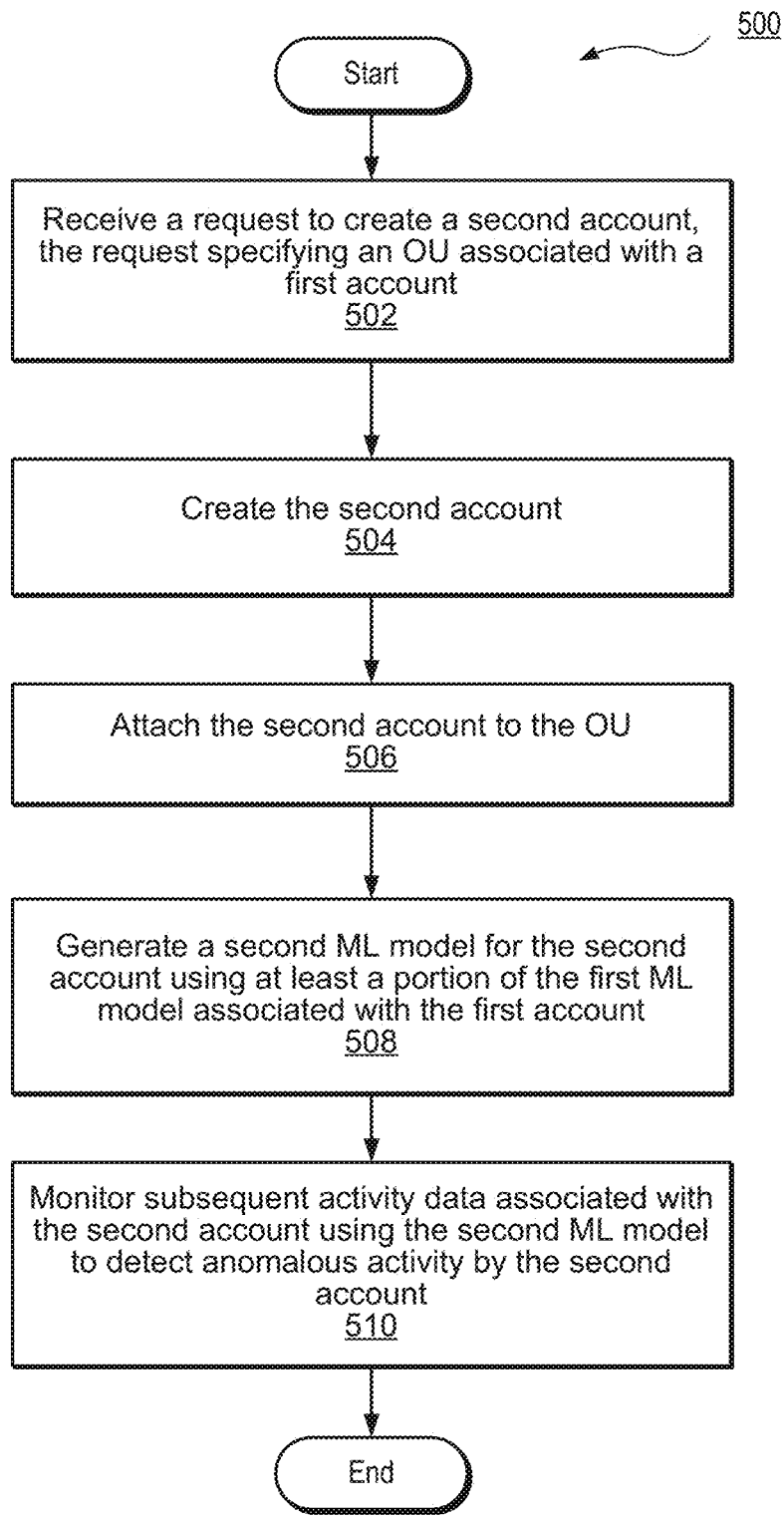
FIG. 5 is a flow diagram of a method of generating a second ML model for a second account from a first ML model associated with a first account in a same OU as the second account according to one embodiment.

FIG. 5 is a flow diagram of a method 500 of generating a second ML model for a second account from a first ML model associated with a first account in a same OU as the second account according to one embodiment. The method 500 may be performed by processing logic that includes hardware (e.g., circuitry, dedicated logic, programmable logic, microcode, etc.), software (e.g., instructions run on a processor to perform hardware simulation), or a combination thereof. In one embodiment, the method 500 may be performed by the organization service 108 of FIG. 1. In another embodiment, the method 500 may be performed by the threat detection system 102 of FIG. 1. In one embodiment, the method 500 may be performed by the organization service 204 of FIG. 2. Alternatively, the method 500 may be performed by other components described with respect to FIGS. 1-4.

Referring to FIG. 5, at block 502, the processing logic implementing the method 500 may begin by receiving a request to create a second account in a cloud computing system having multiple web services. The request specifies an OU associated with a first account of the cloud computing system. The processing logic executes a first instance of a threat detection service to monitor activity data associated with the first account and detect anomalous activity by the first account using a first machine learning (ML) model. The processing logic creates the second account (block 504) and attaches the second account to the OU (block 506). The processing logic generates a second ML model for the second account using at least a portion of the first ML model (block 508). The processing logic monitors subsequent activity data associated with the second account using the second ML model to detect anomalous activity by the second account (block 510), and the method 500 ends.

In a further embodiment, the method at block 508 creates a copy of the first ML model to generate the second ML model. In another embodiment, the processing logic at block 508 identifies at least one feature of the first ML mode and creates a copy of the at least one feature of the first ML model to generate the second ML model. In another embodiment, the first ML model has multiple features, each featuring having a feature-stability score. At block 508, the processing logic can identify at least one feature of the first ML model having a feature-stability score above a threshold value and creates a copy of the at least one feature of the first ML model to generate the second ML model.

In some embodiments, a second instance of the threat detection service uses the second ML model to detect anomalous activity. In a further embodiment, a third instance of the threat detection service uses a third ML model. The third instance may monitor activity data associated with the first account and a third account and may detect anomalous activity by the first account, the third account, or both, using the third ML model. In another embodiment, the third instance monitors a third account in the same OU as the first account and may detect anomalous activity by the third account using a third ML model. In some cases, the first ML model has a first model stability score and the third ML model has a second stability score. The processing logic at block 508 determines that the first model stability score is higher than the second model stability score and creates a copy the first ML model to generate the second ML model. In another embodiment, the processing logic at block 508 determines that the second model stability score is higher than the first model stability score and creates a copy of the second ML model to generate the second ML model.

Figure 6:
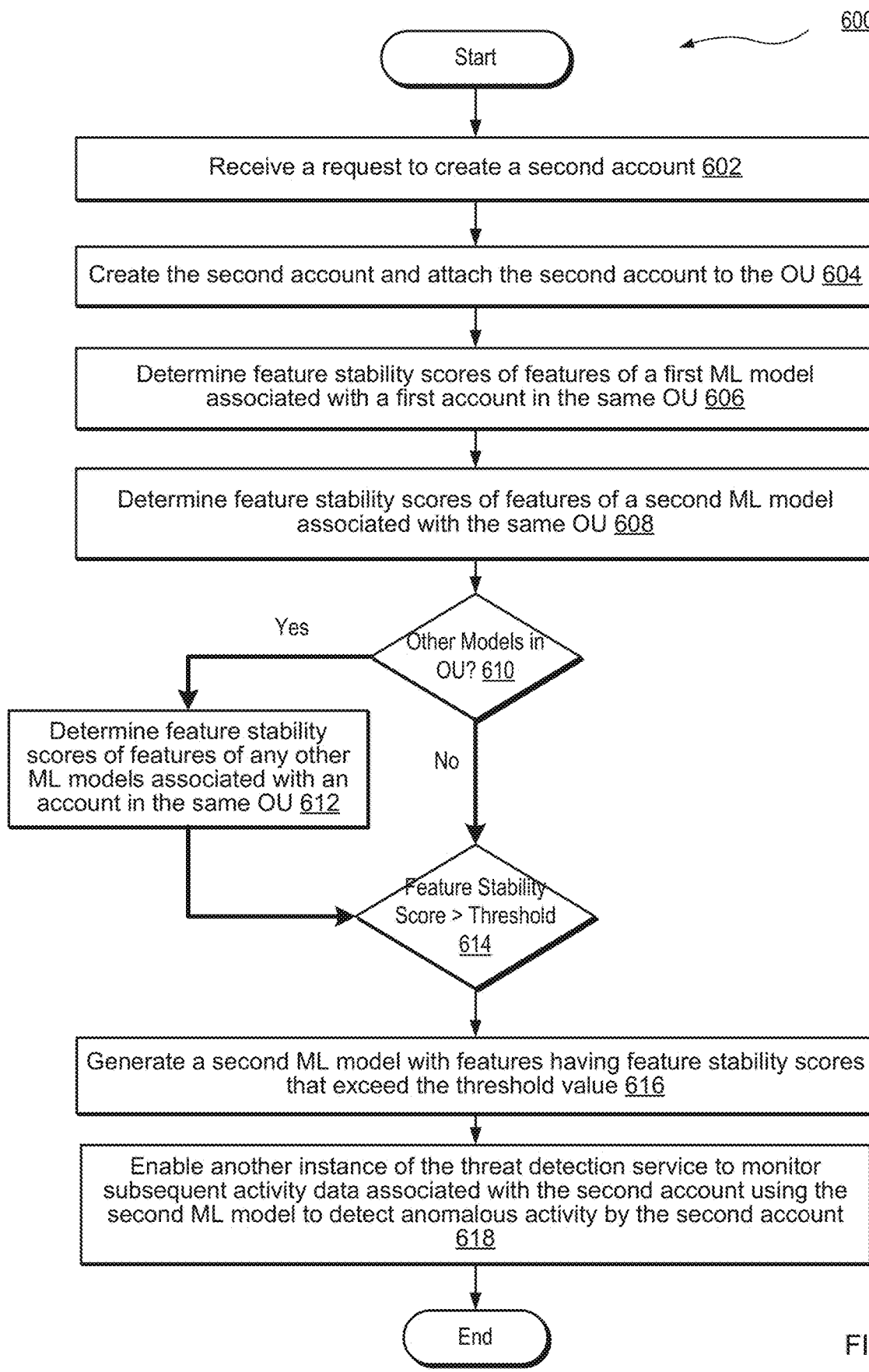
FIG. 6 is a flow diagram of a method of generating a ML model according to another embodiment.

FIG. 6 is a flow diagram of a method of generating a ML model according to another embodiment. The method 600 may be performed by processing logic that includes hardware (e.g., circuitry, dedicated logic, programmable logic, microcode, etc.), software (e.g., instructions run on a processor to perform hardware simulation), or a combination thereof. In one embodiment, the method 600 may be performed by the organization service 108 of FIG. 1. In another embodiment, the method 600 may be performed by the threat detection system 102 of FIG. 1. In one embodiment, the method 600 may be performed by the organization service 204 of FIG. 2. Alternatively, the method 600 may be performed by other components described with respect to FIGS. 1-4.

Referring to FIG. 6, at block 602, the processing logic implementing the method 600 may begin by receiving a request to create a second account in a cloud computing system having multiple web services. The request specifies an OU associated with a first account of the cloud computing system. The processing logic executes a first instance of a threat detection service to monitor activity data associated with the first account and detect anomalous activity by the first account using a first machine learning (ML) model. The processing logic creates the second account and attaches the second account to the OU (block 604). The processing logic determines feature-stability scores of features of the first ML model associated a first account in the same OU (block 606). The processing logic determines feature-stability scores of features of a second ML model associated the OU (block 608). The processing logic determines if there are any other ML models in the OU (block 610). If there are more ML models in the OU, the processing logic determines feature-stability scores of features of any other ML models associated with accounts in the same OU (block 612) and proceeds to block 614. If at block 610, the processing logic determines that there are no additional ML models in the OU, the processing logic proceeds to block 614. At block 614, the processing logic compares the feature-stability scores against a threshold value. The processing logic generates a second ML model with features having feature-stability scores that exceed the threshold value (block 616). The processing logic enables another instance of the threat detection service to monitor subsequent activity data associated with the second account using the second ML model to detect anomalous activity by the second account (block 618), and the method 600 ends.

Alternatively, the method 600 may include similar operations as described above with respect to method 500 of FIG. 5.

Figure 7:
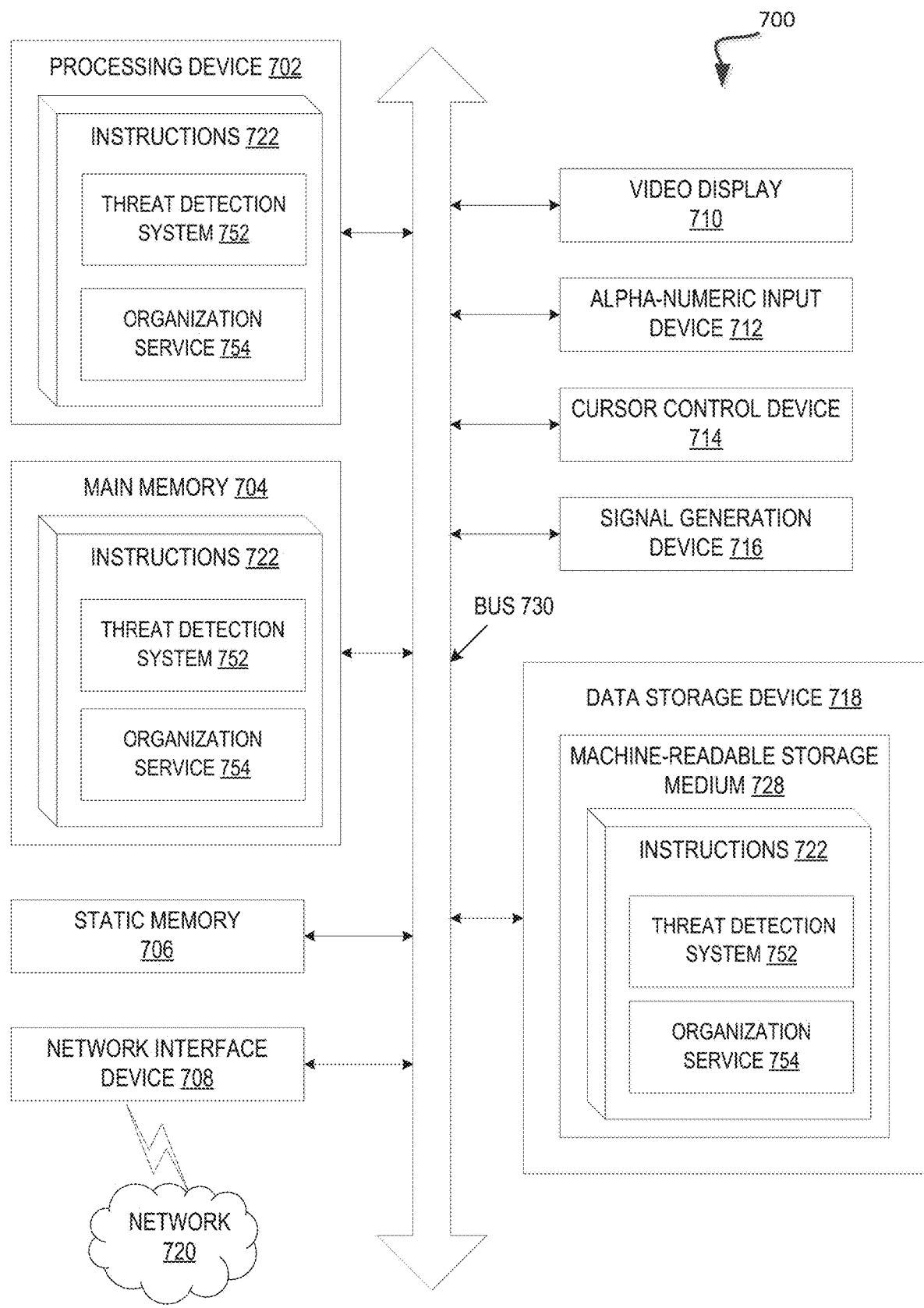
FIG. 7 is a schematic block diagram that provides one example illustration of a computing device within which a set of instructions, for causing the machine to perform any one or more of the methodologies discussed herein, may be executed.

FIG. 7 illustrates a diagrammatic representation of a machine in the exemplary form of a computer system (computing device) 700 within which a set of instructions, for causing the machine to perform any one or more of the methodologies discussed herein, may be executed. The system 700 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute instructions for a threat detection system 752, an organization service 754, or any combination thereof for performing the operations discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable storage medium 728 on which is stored one or more sets of instructions of the threat detection system 752, the organization service 754, or both, embodying any one or more of the methodologies or functions described herein. The instructions may also reside, completely or at least partially, within the main memory 704 and/or within processing logic of the processing device 702 during execution thereof by the computer system 700, the main memory 704 and the processing device 702 also constituting computer-readable media.

While the computer-readable storage medium 728 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory computer-readable medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "processing", "combining", "verifying", "determining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. In addition, embodiments of the present disclosure are described with reference to Java 8, JML and Open JML. However, it should be understood that the principles and techniques set forth herein may be applied to other programming languages that have both imperative programming features and functional programming features. Accordingly, it will be appreciated that a variety of programming languages may be used to implement the teachings of the embodiments of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

monitoring, by a threat detection system executed by one or more processors, event data corresponding to a plurality of accounts in a cloud computing system;

detecting, using an existing trained machine learning (ML) model of the threat detection system at a first time, an anomalous event for an existing account from the event data corresponding to the existing account, wherein the anomalous event is indicative of at least one of anomalous account activity or anomalous network activity by the existing account, wherein the existing account is assigned to a first organization unit (OU) having one or more of the plurality of accounts to which a first set of one or more service control policies (SCPs) is applied;

detecting, using a second existing trained ML model of the threat detection system at a second time, a second anomalous event for a second existing account from the event data corresponding to the second existing account, wherein the second existing account is assigned to a second OU having one or more of the plurality of accounts to which a second set of one or more SCPs is applied, the second set being different than the first set;

receiving, by an organization web service executed by the one or more processors at a third time after the first time, a request to create a new account in the first OU, wherein the organization web service centrally controls resources and services used by the plurality of accounts in the cloud computing system;

creating, by the organization web service, the new account;

attaching, by the organization web service, the new account to the first OU;

assigning, by the organization web service, the first set of one or more SCPs to the new account;

creating a new ML model from at least a portion of the existing ML model;

subsequently monitoring, by the threat detection system, subsequent event data corresponding to the plurality of accounts; and detecting, using the new ML model, an anomalous event for the new account from the subsequent event data corresponding to the new account, wherein the anomalous event for the new account is indicative of malicious behavior or unauthorized behavior by the new account.

2. The method of claim 1, wherein the monitoring the event data comprises collecting, analyzing, and correlating at least one of:
- account activity data from an account activity log;
- network traffic data from a network traffic log;
- processing activity from a process activity log;
- domain name system (DNS) log data from a DNS log; or
- storage service data from a storage service log.

3. The method of claim 1, wherein the threat detection system further comprises a OU-level trained ML model corresponding to the one or more of the plurality of accounts in the first OU, wherein the existing trained ML model is an account-level trained ML model and is different than the OU-level trained ML model, and wherein the creating the new ML model comprises creating the new ML model from at least portions of the OU-level trained ML model and the account-level trained ML model.

4. The method of claim 1, wherein creating the new ML model comprises generating a copy of the existing ML model to create the new ML model.

5. The method of claim 1, further comprising initiating, in response to detection of the anomalous event, at least one of a notification, an automated remediation action in the cloud computing system, or an automated prevention action in the cloud computing system.

6. A method comprising:
- monitoring, by a processing device, activity data associated with a first account in a cloud computing system having multiple web service, the first account being associated with a first organization unit (OU) and having a first set of one or more service control policies (SCPs) applied;
- monitoring, by the processing device, activity data associated with a second account in the cloud computing system, the second account being associated with a second OU and having a second set of one or more SCPs applied, the second set being different than the first set;
- receiving, by the processing device, a request to create a third account in the cloud computing system, the request specifying the first OU, wherein a first instance of a threat detection service monitors activity data associated with the first account and detects anomalous activity by the first account using a first stochastic model;
- creating the third account;
- attaching the third account to the OU;
- applying the first set of one or more SCPs to the third account;
- generating a second stochastic model for the third account using at least a portion of the first stochastic model, wherein the second stochastic model is generated after the first stochastic model has been used to detect the anomalous activity by the first account; and
- monitoring subsequent activity data associated with the third account using the second stochastic model to detect anomalous activity by the third account.

7. The method of claim 6, wherein the generating the second stochastic model comprises creating a copy of the first stochastic model to generate the second stochastic model.

8. The method of claim 6, wherein the first stochastic model is a first machine learning (ML) model and the second stochastic model is a second ML model, wherein the generating the second ML model comprises:
- identifying at least one feature of the first ML model; and
- creating a copy of the at least one feature of the first ML model to generate the second ML model.

9. The method of claim 6, wherein the first stochastic model is a first machine learning (ML) model and the second stochastic model is a second ML model, wherein the first ML model comprises a plurality of features, each feature comprising a feature-stability score, wherein the generating the second ML model comprises:
- identifying at least one feature of the first ML model having a feature-stability score above a threshold value; and
- creating a copy of the at least one feature of the first ML model to generate the second ML model.

10. The method of claim 6, wherein the first stochastic model is a first machine learning (ML) model and the second stochastic model is a second ML model, wherein a second instance of the threat detection service uses the second ML model to monitor the subsequent activity data, and wherein a third instance of the threat detection service uses a third ML model.

11. The method of claim 10, wherein the third instance of the threat detection service monitors activity data associated with the first account and a fourth account and detects the anomalous activity by the first account, the fourth account, or both, using the third ML model, wherein the third account is associated with the first OU.

12. The method of claim 10, wherein the third instance of the threat detection service monitors activity data associated with a fourth account and detects anomalous activity by the fourth account using the third ML model, wherein the third account is associated with the first OU.

13. The method of claim 10, wherein the first ML model comprises a plurality of features, each feature comprising a feature-stability score, wherein the third ML model comprises a plurality of features, each feature comprising a feature-stability score, wherein the generating the second ML model comprises:
- identifying a feature of the first ML model having a feature-stability score above a threshold value;
- identifying a feature of the third ML model having a feature-stability score above the threshold value; and
- creating a copy of the feature of the first ML model and a copy of the feature of the third ML model to generate the second ML model.

14. The method of claim 10, wherein the first ML model comprises a first model stability score and the third ML model comprises a second model stability score, wherein the generating the second ML model comprises:
- determining that the first model stability score is higher than the second model stability score; and
- creating a copy the first ML model to generate the second ML model.

15. A cloud computing system comprising:
- one or more memory devices;
- one or more processing devices operatively coupled to the one or more memory devices, wherein the one or more processing devices are to execute a policy-based management service to centrally control resources and services used by a plurality of accounts of the cloud computing system, the policy-based management service to:

apply a first set of service control policies (SCPs) to a first organization unit (OU) associated with a first account;

apply a second set of SCPs to a second organization unit associated with a second account, the second set of SCPs being different than the first set of SCPs, receive a request to create a third account, the request specifying the first OU, wherein a first instance of a threat detection service is enabled to detect anomalous activity by the first account using a first machine learning (ML) model;

create the third account;

attach the third account to the OU;

generate a second ML model for the third account using at least a portion of the first ML model, wherein the second ML model is generated after the first ML model has been used to detect the anomalous activity by the first account; and enable a second instance of the threat detection service to detect anomalous activity by the third account using the second ML model.

16. The cloud computing system of claim 15, wherein, to generate the second ML model, the policy-based management service is to create a copy of the first ML model.

17. The cloud computing system of claim 15, wherein, to generate the second ML model, the policy-based management service is to:
identify at least one feature of the first ML model; and
create a copy of the at least one feature of the first ML model for the second ML model.

18. The cloud computing system of claim 15, wherein the first ML model comprises a plurality of features, each feature comprising a feature-stability score, and wherein, to generate the second ML model, the policy-based management service is to:
identify at least one feature of the first ML model having a feature-stability score above a threshold value; and
create a copy of the at least one feature of the first ML model for the second ML model.

19. The cloud computing system of claim 15, wherein a third instance of the threat detection service is enabled to detect the anomalous activity by the first account, a fourth account, or both, using a third ML model, wherein the fourth account is associated with the first OU.

20. The cloud computing system of claim 15, wherein a third instance of the threat detection service is enabled to detect anomalous activity by a fourth account using a third ML model, wherein the fourth account is associated with the first OU.

21. A method comprising:
monitoring, by a processing device, activity data associated with a first account in a cloud computing system having multiple web service, the first account being associated with a first organization unit (OU) and having a first set of one or more service control policies (SCPs) applied;

monitoring, by the processing device, activity data associated with a second account in the cloud computing system, the second account being associated with a second OU and having a second set of one or more SCPs applied, the second set being different than the first set;

receiving, by the processing device, a request to create a third account in the cloud computing system, the request specifying the first OU, wherein a first instance of a threat detection service monitors activity data associated with the first account and detects anomalous activity by the first account using a stochastic model that is trained using the activity data associated with the first account;

creating the third account, wherein the third account is created after the stochastic model has been used to detect the anomalous activity by the first account;

attaching the third account to the OU;

applying the first set of one or more SCPs to the third account; and monitoring subsequent activity data associated with the third account using the stochastic model to detect anomalous activity by the third account.

22. The method of claim 21, wherein the stochastic model is an OU-level trained machine learning (ML) model.

* * * * *